W. G. COX.
REBOUND BRAKE FOR SPRING VEHICLES.
APPLICATION FILED AUG. 20, 1913.
1,110,311.
Patented Sept. 15, 1914.
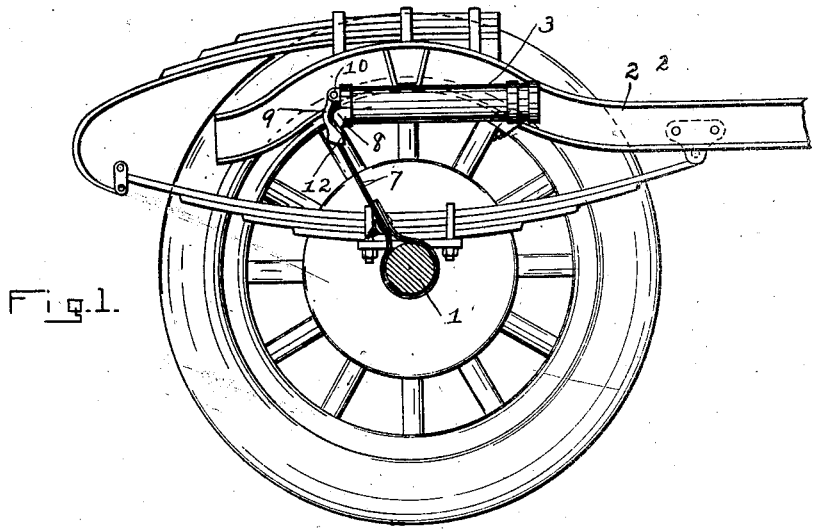
Fig. 1.
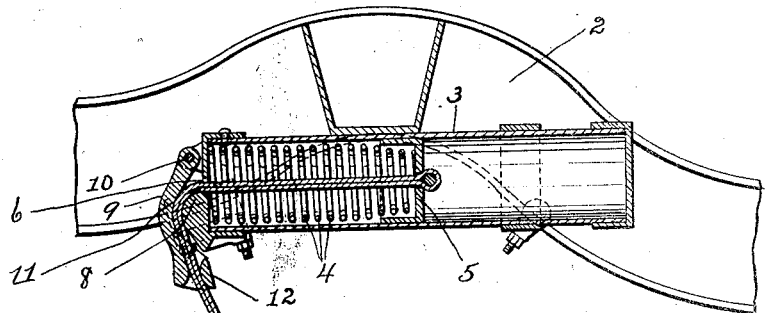
Fig. 2.
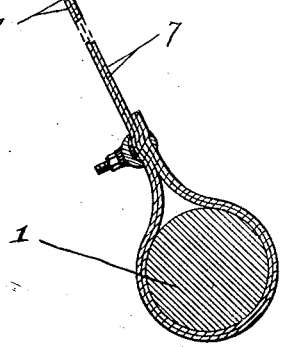
Witnesses:
Rose A. Leduc.
Loretta F. Brady.
Inventor:
William G. Cox,
By
Frank C. Curtis,
Attorney

UNITED STATES PATENT OFFICE.

WILLIAM G. COX, OF ALBANY, NEW YORK.

REBOUND-BRAKE FOR SPRING-VEHICLES.

1,110,311.   Specification of Letters Patent.   Patented Sept. 15, 1914.

Application filed August 20, 1913. Serial No. 785,615.

*To all whom it may concern:*

Be it known that I, WILLIAM G. COX, a citizen of the United States, residing at Albany, county of Albany, and State of New York, have invented certain new and useful Improvements in Rebound-Brakes for Spring-Vehicles, of which the following is a specification.

The invention relates to such improvements and consists in the novel construction and combination of parts hereinafter described and subsequently claimed.

Reference may be had to the accompanying drawings, and the reference characters marked thereon, which form a part of this specification.

Similar characters refer to similar parts in the several figures therein.

Figure 1 of the drawings is a vertical cross-section through the rear axle of an automobile, showing my improved rebound-brake-mechanism in side elevation. Fig. 2 is a vertical section on a larger scale taken longitudinally through the center on the rebound-brake-mechanism.

The principal object of the invention is to retard or check the rebound of the spring-supported body of an automobile or similar vehicle.

My improved rebound-brake may be applied at any desired point between the two vehicle members, one of which is spring-supported upon the other. In the drawings I have shown the brake applied between the rear axle and body of the vehicle.

Referring to the drawings wherein the invention is shown in preferred form, 1 is the rear axle, and 2 is the frame of the body of the car.

Mounted upon the frame, 2, is a horizontally arranged cylinder, 3, within which a coil-spring, 4, is confined under compression between the rear end of the cylinder, and a cup-shaped washer, 5, loosely fitting within the cylinder, 3. The rear end of the cylinder is provided with a slotted aperture, 6. A belt, 7, is connected with the washer, 5, and extends out through the aperture, 6, and thence downward to the rear axle, 1, with which it is connected as shown. The lower wall of the aperture, 6, is outwardly extended and convexed to form a support, 8, over which the belt, 7, changes direction in passing from the cylinder, 3, to the rear axle, 1, which support, 8, forms one member of the belt-clamping mechanism. The other member of the belt-clamping mechanism is formed by a clamping-lever, 9, pivoted at 10 upon the rear end of the cylinder, 3, and formed with a clamping-surface, 11, engageable with the rear side of the belt, 7, and adapted to coöperate with the support, 8, to clamp the belt, 7, therebetween. The clamping-lever, 9, is formed with an offset, 12, which offset projects into the path of the belt, 7, between the support, 8, and the rear axle, and by engagement with the front side of the belt serves to operate the clamping-lever, 9, by the tension of the belt, to tightly clamp the belt between said clamping-lever and the support, 8.

The operation of the device is as follows: The coil-spring, 4, being under compression instantly expands to take up the slack in the belt, 7, whenever the body and axle of the vehicle are moved toward one another, as when the axle is suddenly raised or when the body of the vehicle is suddenly depressed. The rebound due to the tendency to react of the vehicle-springs which support the body upon the axle at once creates a tension upon the belt, 7, which tension varies in accordance with the violence or quickness of the rebound, causing the belt to exert a greater or less degree of pressure upon the offset, 12, to automatically operate the clamping-member, 9, and thus to retard the paying out of the belt, 7, thereby braking or checking the rebound.

I have shown a preferred form of belt, 7, made of a plurality of separate plies which tend to creep one upon another in passing around the convexed support, 8, which creeping movement of the belt-plies relatively to each other, as well as the movement of both plies around the support, 8, is resisted and retarded by the clamping-mechanism.

What I claim as new and desire to secure by Letters Patent is—

1. The combination with a pair of members one spring-supported upon the other; of a take-up spring mounted upon one of said members; a belt-connection between said take-up spring and the other of said members; and belt-clamping-mechanism automatically actuated by the tension of the belt.

2. The combination with a pair of members one spring-supported upon the other;

of a take-up spring mounted upon one of said members; a belt-connection between said take-up spring and the other of said members; and belt-clamping-mechanism engageable with the belt between said take-up spring and said other member, said belt-clamping-mechanism being automatically actuated directly by the belt under tension.

3. The combination with a pair of members one spring-supported upon the other; of a take-up spring, and belt-clamping-mechanism mounted upon one of said members; and a belt-connection between said take-up spring and the other of said members, said clamping-mechanism comprising a support over which the belt slides, and a clamping-lever engageable with one side of the belt to force the belt against said support, and having a member in engagement with the opposite side of said belt in the path between said support and said other member.

4. The combination with a pair of members one spring-supported upon the other; of a cylinder mounted upon one of said members; a coil-spring confined within said cylinder; a belt connected at one end with said coil-spring and at the other end with the other of said members; and belt-clamping-mechanism engageable with said belt between said spring and the other member, said clamping-mechanism having a movable member over which said belt passes adapted to be automatically actuated by the tension of the belt.

5. The combination with a pair of members one spring-supported upon the other; of a take-up spring, and clamping-mechanism mounted upon one of said members; and a belt composed of a plurality of separate plies connecting said take-up spring with the other member and changing direction at the clamping-mechanism, said clamping-mechanism comprising a support over which the belt changes direction and a clamping-member coöperative with said support, automatically operated by the tension of the belt.

6. The combination with a pair of members, one spring-supported upon the other; of a take-up spring mounted upon one of said members; a belt connecting said take-up spring with the other member, said belt being composed of a plurality of separate plies capable of a limited relative longitudinal movement; and belt-clamping mechanism embracing both plies of the belt, comprising in part a support over which said belt changes direction.

In testimony whereof, I have hereunto set my hand this 14th day of August, 1913.

WILLIAM G. COX.

Witnesses:
  RICHARD GRACE,
  E. M. KENESTON.